United States Patent Office 3,203,891
Patented Aug. 31, 1965

3,203,891
HYDROCARBON PURIFICATION PROCESS AND CATALYST THEREFOR
Donald L. Holden, Des Plaines, Ill., assignor to Universal Oil Products Company, Des Plaines, Ill., a corporation of Delaware
No Drawing. Filed Mar. 15, 1963, Ser. No. 265,341
5 Claims. (Cl. 208—216)

This application is a continuation-in-part of my copending application Serial Number 138,558, filed September 18, 1961, now abandoned. The invention described herein relates to a process for the purification, or treating, of hydrocarbons and various mixtures of hydrocarbons. More specifically, the present invention encompasses a particular composite for utilization in a catalytic process for the purification of hydrocarbons containing large quantities of olefinic hydrocarbons, and which are further contaminated by the presence of excessive quantities of sulfurous and nitrogenous compounds.

The purification catalyst of the present invention may be employed to great advantage in the preparation of saturated charge stocks which are substantially completely free from combined sulfur and nitrogen, and intended for subsequent utilization as charge stock for other processes. For example, within the petroleum industry, it is especially desirable to reform catalytically various straight-run gasolines, natural gasolines, catalytically-cracked naphtha fractions and/or thermally-cracked hydrocarbon distillates, for the primary purpose of improving the anti-knock characteristics thereof, or producing an aromatic-rich hydrocarbon product. Processes utilizing a catalytic composite consisting primarily of platinum and alumina, and particularly a catalyst also containing combined halogen, are especially advantageous in the reforming of hydrocarbon fractions of the type hereinbefore set forth. The platinum-containing catalytic composite effects a particularly desirable combination of reactions including the controlled hydrocracking and isomerization of paraffins, the hydrogenation of naphthenes to form aromatic hydrocarbons and the dehydrocyclization of paraffins to aromatics. Through the proper selection of operating conditions, generally dependent upon the precise physical and chemical characteristics of the hydrocarbon charge stock, a platinum-containing catalyst may be utilized for a relatively extended period of time when the hydrocarbon charge stock is comparatively substantially free from various contaminants. However, while processing charge stocks containing excessive concentrations of contaminants, there is incurred the selective poisoning of the catalyst, accompanied by a significant decline in the activity and stability thereof.

It is generally known that the most common contaminants contained in a charge stock to a catalytic reforming process, in addition to oxygenated compounds and detrimental quantities of metals such as arsenic, copper, lead, manganese, etc., are combined sulfur and combined nitrogen. When such a charge stock is caused to contact the platinum-containing reforming catalyst, under reforming conditions, the combined sulfur and nitrogen are released from their respective hydrocarbon molecules, and untimately absorbed onto and within the reforming catalyst. There results a decline in catalytic activity in addition to the normal activity decline resulting from the inherent deposition of coke and other carbonaceous material which effectively shields the catalytically active centers and surfaces from the material being processed. At least partial elimination of these difficulties has been achieved through the use of suitable hydrodesulfurization catalysts at particular conditions of operation, whereby various metallic contaminants are removed, combined sulfur and nitrogen are converted to hydogen sulfide and ammonia, and olefinic hydrocarbons are saturated to form paraffins and naphthenes.

Many hydrocarbons charge stocks, for use in catalytic reforming processes, are derived as hydrocarbon distillates from the liquid product resulting from both catalytic and thermal cracking processes. There exists an abundance of these cracked stocks boiling within the gasoline boiling range, which stocks may in part be employed as motor fuel, or preferably further processed to yield motor fuel of higher quality. Cracked stocks, including those heavier than gasoline, otherwise suitable for use as lubricants and fuel oil, are characterized by a comparatively high degree of unsaturation, and tend to form sludges, gums, and varnishes while in storage. Generally, such cracked stocks are simultaneously severely contaminated through the inclusion of excessive quantities of sulfurous and nitrogenous compounds. In order to achieve the most economical utilization of such hydrocarbon stocks, it is necessary to effect purification thereof through the destructive removal of the nitrogenous and sulfurous compounds, and by effecting the saturation of the olefinic and diodefinic compounds. As hereinbefore stated, purification processes employing a suitable hydrodesulfurization catalyst are at least partially successful in serving this particular function. However, it often becomes difficult to effect an extended period of operation, without experiencing excessive down-time as a result of the need for frequent catalyst regeneration, or due to exceedingly high initial operation severity necessitated by the low initial activity of the catalytic composite employed. That is, one type catalytic composite will indicate a high activity initially, with respect to the purification of the hydrocarbon stream, but will exhibit the undesirable propensity to promote detrimental side reactions resulting in the deposition of excessive quantities of coke and other carbonaceous material. On the other hand, another type of catalytic composite, although possessing an acceptable degree of selectivity insofar as the type of reactions promoted, has a low degree of initial activity and to the extent that exceedingly high initial operating severities must be utilized to achieve an acceptable degree of purification.

A primary object of the present invention is to provide a catalyst capable of effecting the purification of contaminated hydrocarbons and mixtures of hydrocarbons, such that these hydrocarbons are extremely well suited as charge material to catalytic reforming processes, as lubricants or fuel oils, etc., and which catalyst does not exhibit the tendency to promote the undesirable coke-forming reactions.

Therefore, in a broad embodiment, the present invention relates to a hydrocarbon purification catalyst which comprises a composite of gibbsite alumina, an alumina-silica cracking catalyst, containing from about 65.0% to about 90.0% by weight of silica, and at least one metallic component selected from the metals of Groups VI-A and VIII of the Periodic Table, and compounds thereof.

In another broad embodiment, the present invention is directed toward a hydrocarbon purification catalyst which comprises a composite of gibbsite alumina, from about 30.0% to about 70.0% by weight of an alumina-silica cracking catalyst, containing from about 65.0% to about 90.0% by weight of silica, molybdenum and at least one metallic component selected from the iron group of the Periodic Table, and compounds thereof.

In a more specific embodiment, the present invention involves a process for the purification of hydrocarbons and mixtures of hydrocarbons, contaminated by sulfurous and nitrogenous compounds, which process comprises passing said contaminated hydrocarbons into a hydrorefining reaction zone, maintained under an imposed hydrogen pressure in excess of about 100 pounds per square inch and containing a hydrorefining catalytic composite of gibbsite alumina, from about 30.0% to about 70.0% by weight of an alumina-silica cracking catalyst, containing about 65.0% to about 90.0% by weight of silica, from about 5.0% to about 25.0% by weight of molybdenum and from about 1.0% to about 10.0% by weight of at least one metallic component selected from the iron-group of the Periodic Table; removing from said hydrorefining reaction zone a mixture of normally liquid hydrocarbons and normally gaseous material containing hydrogen sulfide and ammonia, thereafter subjecting said mixture to separation to recover said liquid hydrocarbons substantially free from the aforesaid sulfurous and nitrogenous compounds.

As previously stated, processes for effecting the hydrogenation of unsaturated hydrocarbons and mixtures of hydrocarbons, which processes are known to effect at least a partially successful purification of such hydrocarbons, are fairly well-known and well-defined within the prior art. These processes generally utilize a hydrodesulfurization, or hydrorefining catalyst consisting of an alumina carrier material with which has been combined catalytically active metallic components selected from Groups VI–A and VIII of the Periodic Table. The prior art indicates a variety of methods for the preparation of such catalytic composites, as well as a wide range in the composition thereof. The hydrodesulfurization catalyst of the present invention, although consisting of catalytically active metallic components from Groups VI–A and VIII of the Periodic Table, is primarily directed toward the carrier material employed in conjunction with such catalytically active metallic components.

In general, the prior art processes utilize a carrier material consisting essentially of a synthetically prepared alumina, the method of preparation involving precipitation from a substantially pure aluminum compound. These prior art hydrodesulfurization catalysts usually possess an acceptable degree of activity and an accompanying relatively low degree of carbon deposition. The utilization of less expensive types of alumina, such as Bayer Process alumina, which is derived from naturally-occurring bauxite, have heretofore been found not suitable as a result of their inherent low degree of activity, notwithstanding a lesser tendency to effect coke-forming reactions. For this reason, Bayer Process aluminas, otherwise known as alpha-alumina trihydrate, or gibbsite, are not widely employed. On the other hand, to attempt to increase the activity of the catalytic composite through the incorporation of a cracking component, such as a synthetic silica-alumina cracking catalyst, results in an excessive degree of coke deposition, notwithstanding the increase in the degree of removal of nitrogenous and sulfurous compounds. It necessarily follows that a catalytic composite, containing the same concentration of catalytically active metallic components, utilizing a carrier material consisting of a physical mixture of the cracking catalyst (alumina-silica) and gibbsite alumina, such as that derived from bauxite by the Bayer Process, would be thought to be not economically acceptable as a result of both low initial activity and excessive deposition of coke and other carbonaceous material. On the contrary, I have found that a highly active, highly selective desulfurization catalyst is obtained when the catalytically active metallic components are combined with a particular physical mixture of gibbsite alumina and a silica-alumina cracking catalyst, the latter containing from about 65.0% to about 90.0% by weight of silica.

The hydrocarbon purification catalyst of the present invention comprises a physical mixture of gibbsite alumina and from about 30.0% to about 70.0% by weight of an alumina-silica cracking catalyst. The catalytically active components are those selected from Groups VI–A and VIII of the Periodic Table, and particularly molybdenum and at least one metallic component from the iron-group of the Periodic Table. Thus, the catalytically active metallic components are selected from the group of molybdenum, chromium, tungsten, iron, cobalt, nickel, and, in particular instances, minor quantities of platinum, palladium, iridium, osmium, ruthenium, rhodium and mixtures thereof. A particularly preferred catalytic composite, for utilization in the hydrocarbon purification process of the present invention, comprises gibbsite alumina, from about 30.0% to about 70.0% by weight of an alumina-silica cracking catalyst, from about 5% to about 25% by weight of molybdenum and from about 1.0% to about 10.0% by weight of nickel, iron and/or cobalt.

Silica-alumina cracking catalysts are well-known and rather well-defined in the prior art; similarly, many means and methods of manufacturing cracking catalysts of varying composition are available to those possessing skill within the art. It is understood that the method of preparing the cracking catalyst component of the carrier material encompassed by the present invention, is not a limiting factor thereof. Many commercial silica-alumina cracking catalysts, known by various trade names, having compositions within the range of about 65.0% to about 90.0% by weight of silica, are suitable for use as a component of the carrier material. It is, however, preferred that the cracking catalyst be utilized, in conjunction with the gibbsite alumina, in an amount of from 30.0% to about 70.0%, by weight.

The precise means by which the catalytic composite is prepared, is not considered to be a limiting feature of the present invention. Thus, a four-component catalyst, comprising gibbsite alumina, an alumina-silica cracking catalyst, molybdenum and nickel, may be prepared by initially forming a physical mixture of gibbsite alumina and a suitable synthetic alumina-silica composite as hereinabove described. The physical mixture is readily prepared, and formed into particles of uniform size and shape, by commingling finely ground gibbsite alumina with the silica-alumina cracking catalyst, adding a suitable lubricant such as graphite, stearic acid, polyvinyl alcohol, etc., and forming the resulting mixture in a suitable pelleting or extrusion apparatus. As hereinbefore set forth, the alumina-silica composite is utilized in an amount of about 30.0% to about 70.0% by weight, based upon the weight of the finished carrier material. Following the formation into particles of suitable size and shape, the carrier material is dried at a temperature of about 200° F., for a period of from about 2 to about 12 hours, and thereafter subjected to calcination, in an atmosphere of air, for a period of from about 2 to about 12 hours and at a temperature of from about 800° F. to about 1400° F. Although the catalytically active metallic components may be combined with the calcined carrier material in any suitable manner, impregnating methods are preferred. The impregnating method of preparation involves initially forming an aqueous solution of water-soluble compounds of nickel and molybdenum, such as nickel nitrate, nickel chloride, ammonium molybdate, molybdic acid, etc. Where the compound of either molybdenum and/or nickel, or other iron-group metallic component, is not water-soluble at the temperature employed during the impregnating technique, other suitable solvents such as ammoniacal solutions, alcohols, ethers, etc., may be employed. In any event, the carrier material particles are commingled with one or more of the aforementioned aqueous solutions, and subsequently dried at a temperature of about 200° F.; the dried composite is thereafter subjected to high-temperature calcination in an atmosphere of air, at a temperature of from about 600° F. to about 1400° F. The carrier material may be impregnated initially with the molybdenum-containing solution, subsequently dried and calcined, and thereafter impregnated with the nickel-containing solution. On the other hand, the two solutions may be first commingled with each other, the carrier material subsequently impregnated in a single step. Similarly, the catalytically active metallic components, after being composited with the carrier material, may be caused to exist therewith in any desired form, and either as the element or as some compound thereof. It is understood that the concentrations of the catalytically active metallic components, as set forth in the specification and appended claims, refer to these components in the elemental state. Thus, the calcined composite may be further treated for the purpose of providing a catalyst in which the catalytically active metallic components exist as sulfides, nitrates, oxides, sulfates, or in their most obtainable reduced state.

The catalyst of the present invention affords numerous advantages to processes for the pretreatment, or purification of hydrocarbons and mixtures of hydrocarbons. The catalyst is preferably utilized as a fixed-bed, with the hydrocarbon charge and recycled hydrogen passing therethrough in downward flow, upward flow, or radial flow. Moving-bed catalyst systems may be employed, wherein the catalyst and hydrocarbon charge are admixed prior to entering the reaction zone, followed by a suitable separation of the product from the catalyst, and re-circulation of the latter. Depending upon the degree of contaminant concentration, the conditions of operation will be a liquid hourly space velocity (defined as volumes of liquid charge per hour per volume of catalyst disposed within the reaction zone) within the range of about 1.0 to about 20.0, an imposed hydrogen pressure of about 100 to about 1000 pounds per square inch gauge, and a catalyst bed inlet temperature within the range of about 200° F. to about 750° F. A hydrogen recycle gas stream is employed in an amount of about 1000 to about 8000 standard cubic feet per barrel of hydrocarbon charged to the process. The total reaction zone effluent is subjected to a suitable separation technique for the purpose of removing hydrogen, hydrogen sulfide, ammonia, and other gaseous components, and recovering the normally liquid hydrocarbons as product therefrom. The hydrogen is recycled to the reaction zone, an outside source thereof being employed to replenish that which is consumed in the saturation of olefinic hydrocarbons, and in the removal of nitrogenous and sulfurous compounds through the formation of hydrogen sulfide and ammonia.

The following example is given for the purpose of illustrating the benefits to be afforded through the utilization of the hydrodesulfurization catalyst of the present invention. It is understood that insignificant modifications in the conditions, reagents and concentrations of the catalyst and the process employed within the examples, are not considered to be outside the scope and spirit of the appended claims.

EXAMPLE

In this example, reference is made to a "Standard Relative Activity" test procedure. By this method, the relative activity of a given catalyst is defined as the ratio of the space velocity required to result in a given product improvement, while employing the test catalyst, to that space velocity required to yield the same degree of product improvement while employing a primary, standard catalyst, which relative activity is expressed as a percentage. The catalyst employed as the primary standard catalyst is an alumina-cobalt-molybdenum composite consisting of about 2.2% by weight of cobalt, about 5.9% by weight of molybdenum and precipitated alumina. The product quality improvement is measured in terms of the residual basic nitrogen content of the liquid product; the removal of nitrogenous compound is that function of a hydrodesulfurization catalyst most difficult to effect, and, therefore, the relative activity of a given catalyst is more logically based thereupon than on the degree of saturation of olefinic hydrocarbons or the degree of sulfur removal.

The relative activity test procedure consists essentially of processing a particular middle fraction of a California thermally-cracked naphtha boiling within the range of about 200° F. to about 390° F. The catalyst is placed in a reaction zone in an amount of 50 cubic centimeters, and a hydrogen pressure of 800 pounds per square inch is imposed thereupon. The catalyst bed inlet temperature is maintained at a level of 700° F., and hydrogen is passed therethrough (on a once-through basis) in an amount of 3000 standard cubic feet per barrel of liquid charge. Three test procedures are effected at various liquid hourly space velocities ranging from about 2.0 to about 10.0. The liquid effluent, upon which the product inspection is made, is collected over a period of operation of about 4 to about 7 hours. The thermally-cracked California naphtha fraction, employed as the test charge stock, is characterized in that the concentration of the contaminants is 1.33% by weight of sulfur, 300 p.p.m. of nitrogen, and a quantity of unsaturated hydrocarbons which indicates a bromine number of 61. The basic nitrogen concentration of each of the three liquid products is plotted on a logarithmic scale against the reciprocals of the three space velocities employed. From the resulting curve drawn through the three points, a determination is made of the reciprocal of the space velocity required to yield a liquid product having a basic nitrogen content of 2 p.p.m. The relative activity of the test catalyst is derived from the ratio of the reciprocal space velocity, to yield 2 p.p.m. of nitrogen, in regard to the primary, standard catalyst and compared to that of the catalyst being tested. The ratio is multiplied by a factor of 100 and a relative activity factor greater than 100% indicates a test catalyst having a greater activity than the primary, standard catalyst; conversely, a catalyst having a relative activity less than 100%, is less active than the primary, standard catalyst.

In the preparation of the catalysts hereinafter set forth, the source of the gibbsite alumina was a commercial Bayer Process type known as "Alorco C33." The silica-alumina cracking catalyst, containing 75.0% by weight of silica, was "Triple A Aerocat." The first catalytic composite, having a carrier material consisting of 100.0% by weight of the gibbsite alumina, was prepared by impregnating the carrier with an ammoniacal solution of molybdic acid and nickel nitrate. The solution contained 0.211 gram of molybdenum oxide per milliliter and 0.0595 gram of nickel oxide per milliliter; 48.5 milliliters was used to impregnate 100 grams of the gibbsite alumina, the latter existing in the form of ⅛-inch by ⅛-inch cylindrical pills. Following the impregnation of the carrier material, the catalyst was dried in a rotary drier at a temperature of about 200° F., and thereafter calcined in an atmosphere of air at a temperature of about 600° C. The calcined catalyst was analyzed and found to contain 6.0% by weight of molybdenum and 2.05% by weight of nickel, calculated as the elements thereof, and based upon the total weight of the final composite.

Gibbsite alumina, or alpha-alumina trihydrate, resulting from bauxite by the Bayer Process, contains about 35.0% by weight of water. Upon being subjected to a high-temperature calcination technique, at greater than about 800° F., the gibbsite is transformed into gamma-alumina, losing the greater portion of the water. It is understood that the reference to gibbsite alumina after calcination is intended to connote the source of the alumina, and not to specify its morphology. Thus, where composites are made of the active metallic components and gibbsite (existing as gamma-alumina following calcination), the amount specified is based upon wet weight, including the 35.0% by weight of water originally present in the Bayer Process gibbsite alumina.

Two of the catalysts tested, in accordance with the previously described Standard Relative Activity test procedure, comprised physical mixtures of the gibbsite alumina and the commercial silica-alumina cracking catalyst. The first mixture contained 33.3% by weight of the gibbsite alumina, and the second mixture contained 66.7% by weight of the gibbsite alumina. These mixtures were admixed with 2.0% by weight of polyvinyl alcohol, and formed into ⅛-inch by ⅛-inch cylindrical pellets. The pellets were dried, in a rotary drier at a temperature of about 200° F., and subsequently calcined in an atmosphere of air at a temperature of about 670° C. The calcined pellets were impregnated with the above-described ammoniacal solution of molybdic acid and nickel nitrate, such that the catalysts contain 6.0% by weight of molybdenum and 2.05% by weight of nickel. The carrier material of the last catalyst consisted of 100% commercial silica-alumina cracking catalyst which had been pelleted to form ⅛-inch by ⅛-inch cylindrical pills. This carrier material was impregnated with molybdenum and nickel compounds, dried and calcined as hereinabove set forth.

The four catalysts were individually and separately subjected to the Standard Relative Activity test as hereinabove described. In addition to the analysis for residual nitrogenous compounds, each catalyst was analyzed to determine the degree of carbon deposition as a result of the test procedure. The results of the test procedure, the carbon deposition and the quantity of gibbsite alumina in the carrier material, are given in the following table:

Table

| Composite Designation | Bayer Alumina, Wt. Percent | Relative Activity | Carbon, Wt. Percent |
| --- | --- | --- | --- |
| A | 100.0 | 121 | 0.30 |
| B | 66.7 | 171 | 0.60 |
| C | 33.3 | 187 | 0.83 |
| D | 0 | 150 | 2.15 |

It is immediately noted that catalyst "A," having a carrier consisting of 100.0% by weight of the Bayer Process alumina, although indicating a relatively minor degree of carbon deposition, exhibited a low relative activity coefficient of 121. Similarly, catalyst "D," having a carrier of 100% by weight of the commercial silica-alumina cracking catalyst, although indicating a higher relative activity of 150, was adversely affected through the deposition of carbon to the extent of 2.15% by weight. These two catalysts indicate the disadvantages experienced when utilizing Bayer Process alumina and silica-alumina cracking catalyst as the sole component of the carrier material for the catalytically active metallic components. On the one hand, high activity is accompanied by an excessive degree of carbon deposition, whereas a lesser degree of carbon deposition is accompanied by an exceedingly low relative activity coefficient. Unexpectedly, those catalysts prepared through the use of physical mixtures of the silica-alumina cracking catalyst and the Bayer Process alumina, catalysts "B" and "C," did not possess the deleterious characteristics of the catalysts which employed either the Bayer Process alumina or the silica-alumina cracking catalyst in the absence of the other. When utilizing 66.7% by weight of Bayer Process alumina, the relative activity increased to 171 while the carbon deposition decreased from 215% to 0.60% by weight; when employing 33.3% by weight of Bayer Process alumina, the relative activity increased to 187 and the carbon deposition decreased to 0.83% by weight.

The foregoing specification and example indicate the advantages afforded through the utilization of the catalytic composite of the present invention. The unexpected, synergistic effect resulting from the use of a mixture of Bayer Process alumina and silica-alumina cracking catalyst has been clearly illustrated.

I claim as my invention:

1. A process for the purification of hydrocarbons contaminated with sulfurous and nitrogenous compounds which comprises contacting the contaminated hydrocarbons in a hydrorefining reaction zone with a composite of gibbsite alumina, alumina-silica cracking catalyst containing 65% to about 90% by weight of silica and at least one metallic component selected from the metals of Groups VI–A and VIII of the Periodic Table and compounds thereof at a liquid hourly spaced velocity of from about 1.0 to about 20.0 under a hydrogen pressure of from about 100 to about 1000 pounds per square inch gauge and at an inlet temperature to said zone within the range of about 200° F. to about 750° F., removing a mixture of normally liquid hydrocarbons and normally gaseous material containing hydrogen sulfide and ammonia from said hydrorefining reaction zone and thereafter separating said normally gaseous material from said mixture to recover said normally liquid hydrocarbons substantially free from sulfurous and nitrogenous compounds.

2. A process for the purification of hydrocarbons contaminated with sulfurous and nitrogenous compounds which comprises contacting the contaminated hydrocarbons in hydrorefining reaction zone and a composite of gibbsite alumina, from about 30.0% to about 70.0% by weight of alumina-silica cracking catalyst containing from about 65.0% to about 90.0% by weight of silica and at least one metallic compound selected from the metals of Groups VI–A and VIII of the Periodic Table and compounds thereof at a liquid hourly spaced velocity of from about 1.0 to about 20.0 under a hydrogen pressure of from about 100 to about 1000 pounds per square inch gauge and at an inlet temperature to said zone within the range of about 200° F. to about 750° F., removing a mixture of normally liquid hydrocarbons and normally gaseous material containing hydrogen sulfide and ammonia from said hydrorefining reaction zone and thereafter separating said normally gaseous material from said mixture to recover said normally liquid hydrocarbons substantially free from sulfurous and nitrogenous compounds.

3. A process for the purification of hydrocarbons contaminated with sulfurous and nitrogenous compounds which comprises contacting the contaminated hydrocarbons in a hydrorefining reaction zone with a composite of gibbsite alumina, from about 30.0% to about 70.0% by weight of an alumina-silica cracking catalyst, containing from about 65.0% to about 90.0% by weight of silica, molybdenum and at least one metallic component selected from the iron-group of the Periodic Table, and compounds thereof at a liquid hourly spaced velocity of from about 1.0 to about 20.0 under a hydrogen pressure of from about 100 to about 1000 pounds per square inch gauge and at an inlet temperature to said zone within the range of about 200° F. to about 750° F., removing a mixture of normally liquid hydrocarbons and normally gaseous material containing hydrogen sulfide and ammonia from said hydrorefining reaction zone and thereafter separating said normally gaseous material from said mixture to recover said normally liquid hydrocarbons substantially free from sulfurous and nitrogenous compounds.

4. A process for the purification of hydrocarbons contaminated with sulfurous and nitrogenous compounds which comprises contacting the contaminated hydrocarbons in hydrorefining reaction zone with a composite of gibbsite alumina, from about 30.0% to about 70.0% by weight of alumina-silica cracking catalyst, containing from about 65.0% to about 90.0% by weight of silica, from about 5.0% to about 25.0% by weight of molybdenum and from about 1.0% to about 10.0% by weight of at least one metallic component selected from the iron-group of the Periodic Table at a liquid hourly space velocity of from about 1.0 to about 20.0 under a hydrogen pressure of from about 100 to about 1000 pounds per square inch gauge and at an inlet temperature to said zone within the range of about 200° F. to about 750° F., removing a mixture of normally liquid hydrocarbons and normally gaseous material containing hydrogen sulfide and ammonia from said hydrorefining reaction zone and thereafter separating said normally gaseous material from said mixture to recover said normally liquid hydrocarbons substantially free from sulfurous and nitrogenous compounds.

5. The catalyst of claim 4 further characterized in that said composite comprises from about 1.0% to about 10.0% by weight of nickel.

References Cited by the Examiner
UNITED STATES PATENTS

| | | | |
|---|---|---|---|
| 2,854,403 | 9/58 | Weisz | 252—455 |
| 2,880,171 | 3/59 | Flinn et al. | 208—217 |
| 2,892,003 | 6/59 | Weisz | 252—455 |
| 2,894,903 | 7/59 | McGrath et al. | 208—254 |
| 2,905,625 | 9/59 | Berger | 208—216 |
| 2,905,636 | 9/59 | Watkins et al. | 208—254 |
| 2,941,960 | 6/60 | Hindin et al. | 252—455 |
| 2,942,041 | 6/60 | Pitts et al. | 252—455 |
| 2,944,032 | 7/60 | Nixon | 252—466 |
| 3,004,913 | 10/61 | Tucker | 208—254 |

ALPHONSO D. SULLIVAN, *Primary Examiner.*